United States Patent Office 2,845,460
Patented July 29, 1958

2,845,460

2,6,6-TRIMETHYL-CYCLOHEXAN-1-ONE-4-OL AND PREPARATION THEREOF

Otto Isler, Marc Montavon, and Rudolf Ruegg, Basel, Gabriel Saucy, Munchestein, and Paul Zeller, Neuallschwil, Switzerland, assignors to Hoffmann-La Roche Inc., Nutley, N. J., a corporation of New Jersey No Drawing. Application October 3, 1956
Serial No. 613,599

Claims priority, application Switzerland October 11, 1955

2 Claims. (Cl. 260—586)

This invention relates to novel chemical compounds, and to novel processes and novel intermediates useful in the preparation thereof. The broad field of the invention relates to the preparation of $C_{40}$ carotenoids by synthetic methods. The $C_{40}$ carotenoids are useful as coloring agents for foodstuffs and feedstuffs.

In those nomenclatures employed in the instant disclosure wherein $C_{40}$ carotenoid compounds are named on the basis of carotene as a reference structure, the numbers are applied to the forty carbon atoms of the fundamental carotene carbon skeleton according to the numbering system shown in Liebigs Annalen der Chemie, volume 573, page 3 (1951), as a model.

One important aspect of the invention relates to the preparation of 2,6,6-trimethyl-1,4-cyclohexandione and its 4-monoketals, and of 2,6,6-trimethyl-cyclohexan-1-one-4-ol and its acyl esters. These have perfume characteristics and are useful as odorants in the preparation of perfumes and of scented compositions generally. The diketone and hydroxy-ketone above referred to and their respective 4-mono-ketals and 4-esters are especially useful as intermediates in the synthesis of $C_{40}$ carotenoids found in nature as coloring principles, e. g. zeaxanthin, rhodoxanthin, kryptoxanthin, astaxanthin, etc. Thus, for example (cf. copending application of Isler et al., Serial No. 597,885, filed July 16, 1956, now U. S. Patent No. 2,819,298), by ketalization of the oxo group in the 4-position of the above mentioned diketone, followed by condensation of the resulting 4-monoketal with lithium ethoxyacetylide, partial hydrogenation of the condensation product at its triple bond and hydrolysis of the hydrogenation product to the corresponding $C_{11}$ aldehyde, i. e. 2,6,6-trimethyl-4-oxo-1-cyclohexylidene-acetaldehyde; followed still further by conversion of the said $C_{11}$ aldehyde by a cyclic process comprising acetalization, condensation of the acetal with a vinyl ether or a propenyl ether, and hydrolysis, there can be obtained in successive stages the corresponding $C_{14}$ aldehyde, the $C_{16}$ aldehyde, and eventually the $C_{19}$ aldehyde. The $C_{19}$ aldehyde can then be converted to the desired carotenoid by metal-organic condensation thereof with acetylene, dehydration and allylic rearrangement of the $C_{40}$ condensation product, partial hydrogenation of the acetylenic bond in the dehydration product, and isomerization of the partial hydrogenation product. Alternative routes for conversion of the $C_9$ compounds of the invention to $C_{40}$ carotenoids are also available. The hydroxy-ketone, i. e. 2,6,6-trimethyl-cyclohexan-1-one-4-ol and its acyl esters have an agreeable odor which makes these compounds especially suitable as components in perfumes and similar scented compositions.

The compound 2,6,6-trimethyl-1-cyclohexen-4-one employed as starting material in the disclosure of the present invention can be made, for example, from isophorone by known procedures. In the first stage of a comprehensive process according to the invention, 2,6,6-trimethyl-1-cyclohexen-4-one is oxidized by means of an organic per acid, e. g. peracetic acid, perbenzoic acid, phthalic mono per acid, performic acid, etc. The unstable primary oxidation product (apparently an oxido compound) is hydrolyzed, without isolation thereof, to 2,6,6-trimethyl-2-cyclohexen-1-ol-4-one. In an advantageous embodiment of the first stage of the process, 2,6,6-trimethyl-1-cyclohexen-4-one is oxidized with peracetic acid in a glacial acetic acid solution at 0–35° C., the oxidation mixture is made weakly alkaline by addition of 30% sodium hydroxide solution and then shaken at room temperature for one to two hours. The 2,6,6-trimethyl-2-cyclohexen-1-ol-4-one can be isolated by extraction with diethyl ether.

In a second stage, 2,6,6-trimethyl-2-cyclohexen-1-ol-4-one is isomerized to 2,6,6-trimethyl-cyclohexane-1,4-dione. This isomerization can be effected by the action of strongly acidic agents or of ansolvo acids, e. g. $BF_3$ hydrate. Suitable acidic agents are, for example, strong acids, e. g. sulfuric acid, p-toluene-sulfonic acid, phosphoric acid, or salts with strongly acid reaction, e. g. zinc chloride, potassium hydrogen sulfate, etc. It is preferred to heat the 2,6,6-trimethyl-2-cyclohexen-1-ol-4-one with a small amount (1–10% of the weight of the hydroxy-ketone used) of the acidic agent. An advantageous embodiment of the second stage comprises boiling 2,6,6-trimethyl-2-cyclohexen-1-ol-4-one in an inert solvent, such as benzene or toluene with p-toluene-sulfonic acid in the proportion of about two parts by weight of p-toluene-sulfonic acid and 100 parts by weight of the starting hydroxy-ketone. The 2,6,6-trimethyl-cyclohexane-1,4-dione is produced in the form of colorless crystals of camphor-like odor, which melt at 63–65° C. and which do not possess any maxima between 220 and 280 m$\mu$ in the ultraviolet absorption spectrum. The corresponding phenyl-semicarbazone melts at 218-220° C. and shows in the ultraviolet absorption spectrum a maximum at 250 m$\mu$ ($E_1^1 = 1030$ in ethanol)

The ketals of 2,6,6-trimethyl-cyclohexane-1,4-dione can be made according to the usual procedures: by heating with alcohols in inert solvents in the presence of acid catalysts, while continuously distilling off the water formed, or by means of orthocarboxylic acid esters in the presence of acid catalysts. Only the oxo group in the 4-position is ketalized. Especially appropriate ketals are the ethylene ketals, which are particularly stable and are therefore well suited for reactions involving metal-organic condensation of the free keto group.

In a third stage of the comprehensive procedure, the 2,6,6-trimethyl-cyclohexane-1,4-dione is reduced to 2,6,6-trimethyl-cyclohexan-1-one-4-ol. This reduction may be effected for example by partial hydrogenation in the presence of a hydrogenation catalyst. Suitable catalysts are platinum or Raney-nickel. After absorption of 1 mol hydrogen per mol of the dione, practically only the keto group in the 4-position is transformed into a hydroxy group, whereas the keto group in 1-position remains unaltered. The 2,6,6-trimethyl-cyclohexan-1-one-4-ol formed consists of a mixture of the two cis-trans isomers. The one of the two isomers crystallizes out upon standing and forms colorless crystals melting at 56° C. This product may be esterified according to usual methods, for example by treatment with an acylating agent. Illustrative of such an acylation is the reaction of 2,6,6-trimethyl-cyclohexan-1-one-4-ol with acetic anhydride and pyridine, which leads to 2,6,6-trimethyl-4-acetoxy-1-cyclohexanone.

The invention is further disclosed in the following examples, which are illustrative but not limitative thereof. Temperatures are stated in degrees centigrade.

EXAMPLE 1

*2,6,6-trimethyl-cyclohexen-(2)-ol-(1)-one-(4)*

160 ml. of a solution of peracetic acid in acetic acid (530 mg. of peracetic acid per ml.) were added, while stirring, within 2 hours at 0 to 10° C. to 138 grams of 2,6,6-trimethyl-1-cyclohexen-4-one in 50 ml. of glacial acetic acid. The mixture was allowed to stand overnight at 20° C. The mixture was then rendered weakly alkaline (pH about 8) by the addition of ice and 30% caustic soda solution, and the reaction mixture was shaken for 1 hour at 20° C. The reaction mixture was then extracted twice with portions of 800 ml. of ether, and the ether extracts were washed once with 200 ml. of saturated ammonium chloride solution. The combined ether extracts were dried over sodium sulphate, the ether was evaporated, and the resulting residue was distilled in a high vacuum. After a forerun distilling over at 70 and 80° C. 2,6,6-trimethyl-cyclohexen-(2)-ol-(1)-one-(4) was obtained as an almost colorless oil of B. P. 110–112° C./0.1 mm.; $n_D^{20}$=1.501; U. V. maximum at 226 m$\mu$ ($E_1^1$=1110 in petroleum ether solution)

after standing for a while. Phenyl-semicarbazone: M. P. 189–190° C.; U. V. absorption maxima at 240.5 and 285 m$\mu$, respectively ($E_1^1$=807 and 778 in absolute ethanol)

EXAMPLE 2

*2,6,6-trimethyl-cyclohexandione-(1,4)*

100 grams of 2,6,6-trimethyl-2-cyclohexen-1-ol-4-one were refluxed overnight in 200 ml. of benzene with the addition of 2 g. of p-toluenesulphonic acid. After cooling the reaction mixture, 2 g. of sodium bicarbonate were added thereto, the whole was thoroughly mixed and filtered through a column of 200 g. of neutral alumina. The column was further washed with 800 ml. of benzene, the filtrate was concentrated in vacuo, and 500 ml. of petroleum ether (boiling range 80–110° C.) were added, while shaking, to the liquid residue while still hot. The 2,6,6-trimethyl-cyclohexan-1,4-dione which crystallized out on cooling was filtered off and dried at room temperature in the vacuum of a water jet pump. Colorless needles of M. P. 63–65° C.

10 grams of 2,6,6-trimethyl-2-cyclohexen-1-ol-4-one were heated with 1 g. of potassium bisulphate for 20 hours at 100° C. After cooling, the reaction product was dissolved in ether, and the ethereal solution was washed with water and sodium bicarbonate solution. The residue obtained after drying the ethereal solution over sodium sulphate and evaporation of the ether was crystallized in the manner described in the previous paragraph.

10 grams of 2,6,6-trimethyl-2-cyclohexen-1-ol-4-one were heated for 5 hours at 100° C. with 1 g. of concentrated sulphuric acid. The reaction mixture was worked up in the manner described in the previous paragraph.

10 grams of 2,6,6-trimethyl-2-cyclohexen-1-ol-4-one were heated for 4 days at 100° C. with 1 g. of zinc chloride. The reaction mixture was worked up in the manner described in paragraph 2 above.

100 grams of 2,6,6-trimethyl-2-cyclohexen-1-ol-4-one were treated in 200 ml. of toluene in the manner described in paragraph 1 above. There was also obtained 2,6,6-trimethyl-cyclohexan-1,4-dione crystallizing in colorless needles.

EXAMPLE 3

*2,6,6-trimethyl-4,4-ethylenedioxy-cyclohexan-1-one*

A mixture of 34.6 grams of 2,6,6-trimethyl-cyclohexan-1,4-dione (prepared according to Example 1), 100 ml. of benzene, 19 g. of ethylene glycol and 0.2 g. of p-toluenesulphonic acid was boiled for 7 hours, the water that formed being continuously separated by means of a water separator. After cooling, the mixture was poured onto 300 ml. of 5% sodium bicarbonate solution, and 2,6,6-trimethyl-4,4-ethylenedioxy-cyclohexan-1-one was isolated by extraction with ether. Distillation yielded the ketal in the form of a colorless oil of B. P. 70° C./0.02 mm.; $n_D^{21}$=1.469.

EXAMPLE 4

*2,6,6-trimethyl-4-acetoxy-cyclohexan-1-one*

100 grams of 2,6,6-trimethyl-cyclohexan-1,4-dione (prepared according to Example 1) were hydrogenated in 500 ml. of methanol in the presence of 0.5 g. of platinum oxide at room temperature and normal atmospheric pressure. After one mole of hydrogen per mole of dione had been absorbed, the hydrogenation was discontinued, the catalyst was filtered off, and the solution was concentrated in vacuo. On standing, one of the two stereoisomeric 2,6,6-trimethyl-cyclohexan-4-ol-1-ones crystallized from the residue and was obtained in pure form by filtration and crystalliztion from ether and petroleum ether; M. P. 56° C., B. P. 60° C./0.02 mm.

200 grams of 2,6,6-trimethyl-cyclohexan-4-ol-1-one were allowed to stand for 15 hours at 20° C. together with 100 g. of pyridine and 100 G. of acetic anhydride. The reaction mixture was then poured onto ice, and the product was extracted with ether. After drying the ethereal solution over sodium sulphate and concentration there was obtained 2,6,6-trimethyl-4-acetoxy-cyclohexan-1-one in the form of an almost colorless oil of B. P. 84–86° C./0.12 mm.; $n_D^{24}$=1.4560.

We claim:

1. 2,6,6-trimethyl-cyclohexan-1-one-4-ol.
2. A process which comprises reacting 2,6,6-trimethyl-cyclohexan-1,4-dione with approximately one molar proportion of elemental hydrogen at substantially normal temperature and pressure in the presence of a hydrogenation catalyst.

References Cited in the file of this patent

UNITED STATES PATENTS 2,714,602     Abbott _____ Aug. 2, 1955

OTHER REFERENCES

Sabetay et al.: Chem. Abstracts 24 (1930), 5730–1.